Sept. 25, 1962 T. F. SMITH 3,055,265
MOTION PICTURE CAMERA FOR MAKING PANORAMIC PICTURES
Filed Sept. 18, 1959 6 Sheets-Sheet 1

Tom F. Smith
INVENTOR.

Sept. 25, 1962 T. F. SMITH 3,055,265
MOTION PICTURE CAMERA FOR MAKING PANORAMIC PICTURES
Filed Sept. 18, 1959 6 Sheets-Sheet 5

Tom F. Smith
INVENTOR.

BY *Clarence A. O'Brien*
*and Harvey B. Jacobson*
Attorneys

Sept. 25, 1962 T. F. SMITH 3,055,265
MOTION PICTURE CAMERA FOR MAKING PANORAMIC PICTURES
Filed Sept. 18, 1959 6 Sheets-Sheet 6

Tom F. Smith
INVENTOR.

BY *Clarence A. O'Brien*
*and Harvey B. Jacobson*
Attorneys

UNITED STATES PATENT OFFICE 3,055,265
Patented Sept. 25, 1962

3,055,265
MOTION PICTURE CAMERA FOR MAKING PANORAMIC PICTURES
Tom F. Smith, Urbana, Mo., assignor of fifty percent to Rowe E. Carney, Jr., Rolla, Mo.
Filed Sept. 18, 1959, Ser. No. 840,898
2 Claims. (Cl. 88—16.6)

This is a continuation-in-part of application, Serial No. 672,983, filed on Juuly 19, 1957, now abandoned.

The invention relates to a camera for making wide angle or panoramic pictures. More specifically, the invention relates to photographic or television motion pictures, although still pictures may use similar equipment without material change.

Systems capable of producing panoramic or wide angle pictures with standardized equipment or with simple additions to standardized equipment have been proposed but have not been successful to date.

This lack of practical success is partly due to difficulties connected with the taking of the pictures. The invention relates, therefore, to a system and to a camera which overcomes some of the difficulties experienced in connection with such systems and cameras, and this applies equally well to cine cameras or television cameras, although to show the principles of the invention the subsequent description relates primarily to cine cameras and systems.

The invention eliminates one of the major difficulties connected with wide angle pictures taken in sections by placing sectional pictures on the same film, preferably on an area which does not exceed that of a normal picture frame, this result being obtained by using a plurality of objective lens systems in series, with a condenser type plano-convex lens or lens system arranged between them. In the focal plane of a first or sectional objective lens system nearest to the object being photographed, real images of the sections or sectors of the panoramic view are formed, which are viewed through the plano-convex lens system associated with the sectional objective. The second objective lens system throws the picture of the object as it appears in the condenser type lens system on the sensitized layer of the film.

The main object of the invention is thus to provide a camera assembly which produces a picture consisting of suitably grouped sectional pictures contained within a frame of the film subjected to exposure.

A further object of the invention relates to the arrangement of the objectives, and lenses taking sectional pictures, relatively to the objective, producing the assembled picture of all sections of the panoramic view on the sensitized layer in the camera for the embodiments of the invention which deal with cine or still photographic cameras.

The invention is illustrated in the accompanying drawings showing several modifications thereof. It is, however, to be understood that the illustration in the drawings is purely diagrammatical and does neither attempt to show the full constructive arrangement of the camera nor attempt to give a survey of all the various arrangements by means of which the principle of the invention may be carried into effect. The drawings intend to provide diagrammatic views permitting to explain the principle of the invention and several ways of applying the principle. It will be clear to the expert skilled in this art that this principle may be applied in a number of different manners, many of which are not illustrated in the drawing, and that a departure from the diagrammatic illustration in the drawing is not necessarily a departure from the principles of the invention.

Figure 12:
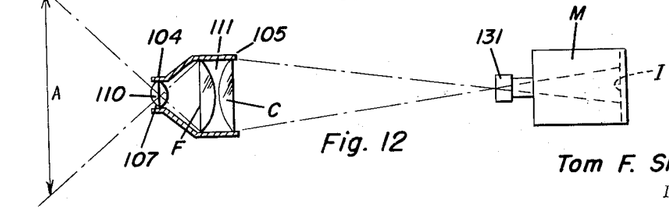
FIGURE 12 is a diagrammatic elevational sectional view, the section being taken through an upper level of a typical embodiment, for example the one shown in FIGURE 11.

To explain the principle of the invention, reference is first made to FIGURE 12 which, although illustrating a detail, shows the basic arrangement in its simplest form. A real image of an object A which is viewed by means of an objective $O_1$ is produced in the focal plane F of the objective. A transparent screen may be placed in this focal plane, and in this case the image would appear on the transparent screen. Such a screen could be arranged in the plane F, but the same result is obtained without a screen. Thus, the screen is unnecessary and may be omitted.

Let it be assumed for the purpose of explanation that a transparent screen is arranged in the focal plane F of objective $O_1$; if a lens assembly C, resembling a condenser lens assembly and consisting of plano-convex lenses, is applied on the other side of the transparent screen, a magnified picture of the screen image produced on the left side of the screen in FIGURE 12 will be seen by an observer on the other side of the screen. The simple plano-convex lens system shown may be replaced by an achromatic system or by an anastigmatic lens system.

If instead of an observer, a conventional camera M with an objective $O_2$ is placed behind the screen and if its objective $O_2$ is properly adjusted, an image of the magnified picture produced by C is thrown on the surface in the focal plane I of the objective $O_2$ and the image in the plane I will be an exact reproduction of the object A.

It will be clear that the screen in the plane F may be omitted because a real (serial) image is produced by the objective $O_1$ which may be thrown on the outermost planar surface of the lens assembly C. The loss of light in the transparent screen will thus be eliminated.

The principle of the invention is based on the above explained basic method of the photographic reproduction of an object, and the camera M may be a cine camera, still camera or a television camera. The object in this case is a panoramic view covering 180° which is indicated in dots and dashes in the diagram FIGURE 1. This panoramic view is divided into four sections 21, 22, 23, 24, represented by lines to avoid confusion, and the image of the panoramic object thus consists of four sectional pictures, each covering an arc of 45°. In the example shown in the diagram FIGURE 1, four sectional objectives are used, one for each arcuate section of 45°, and as these objectives cannot be arranged at the same point and as an accurate encompassing of each section is necessary to allow an accurate joining of the sections, a multiple lens arrangement is shown which produces the desired effect. The arrangement consists of sectional objectives 30, 31, 32, 33 mounted on an objective corner 35. The lenses are so mounted that they form the four corners of a square, but this arrangement is arbitrary as they may be aligned or arranged in cross shape or in any other way thought to be of advantage. In order that each lens may just take in one section and produce its image in the focal plane, refracting or reflecting units 40, 40a, 41, 41a, 42, 42a, 43, 43a must be arranged in front of the sectional objectives, each of said units deflecting light coming from one sector. By way of example mirrors are shown in the diagram, but refracting or reflecting prisms or a combination of prisms and mirrors may likewise be used.

Figures 1, 8:
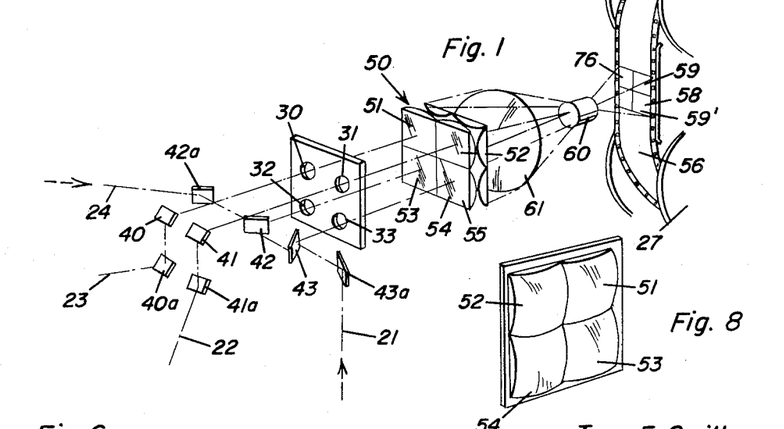
FIGURE 1 is a diagrammatic illustration of a camera embodying the principles of the invention.
FIGURE 8 is a perspective view illustrating one of the condenser type plano-convex lens assemblies.

A pair of mirrors is arranged in front of each sectional objective 30, 31, 32, 33. The pairs of mirrors 40, 40a and 41, 41a are arranged to eliminate the difference in the level of the objectives, all pictures being taken on the same level. These mirrors also produce a double reversion of the picture which therefore is in its correct position with respect to left and right side. Each of said mirror arrangement covers exactly a central sector 22, 23 of 45° of the scene to be photographed. The two lateral sectors 21, 24 are mirrored by the mirror pairs 42, 42a, 43, 43a into the sectional objectives 32, 33, the pair of mirrors used likewise producing a double reversion producing a picture with the left and right sides in the same position in which they are seen on the scene.

Thus each sectional objective 30, 31, 32, 33, by means of one of the mirror units produces a sectional image which is thrown on the focal plane 55. The plane is the same for all four sectional objectives in the example shown and simultaneously is the common plane of the outer surfaces of a lens assembly 50 consisting for example of four plano-convex lenses 51, 52, 53, 54. The lens assembly may consist of four single plano-convex lenses, but preferably a condenser-type lens assembly 50 with units each consisting of the two plano-convex lenses is used, the convex faces to which are turned toward each other. Achromatic lenses may be used, or the plano-convex lens assembly may be replaced by an assembly of anastigmatic lenses.

It will be noted that the arrangement of the sectional objectives 30, 31, 32, 33 and that of the lenses of 51, 52, 53, 54 is centro-symmetrical, the axis of symmetry being the optical axis of the picture assembling objective 60 which is turned towards the lens assembly 50 and which produces an image of the four sections as viewed through the four plano-convex lenses and through the four sectional objectives. Between the lens assembly 50 and the objective 60 a correcting or collimating lens 61 may be arranged. This lens facilitates the exact focusing of the sectional images.

The image is thrown on the sensitized surface in the camera 27, preferably a film 56, which thus receives on the area occupied by one frame 58 sectional pictures of the panoramic object in a predetermined relative arrangement which depends on the way in which the sectional objectives are arranged and on the way in which the light refracting and light reflecting units 40, 40a, 41, 41a, 42, 42a, 43, 43a, are positioned to distribute the sectional pictures of the object among the sectional objectives.

It will be noted that the image of a sector 21 of the panoramic view is produced in the focal plane 55 by means of objective 33 and will therefore appear in section 59 of the frame, while the image of the adjacent sector 22 will appear in section 59', etc. The pictures of the four sectors of the panoramic view thus appear simultaneously on the exposed film at the places indicated by the sector numerals.

Figure 2:
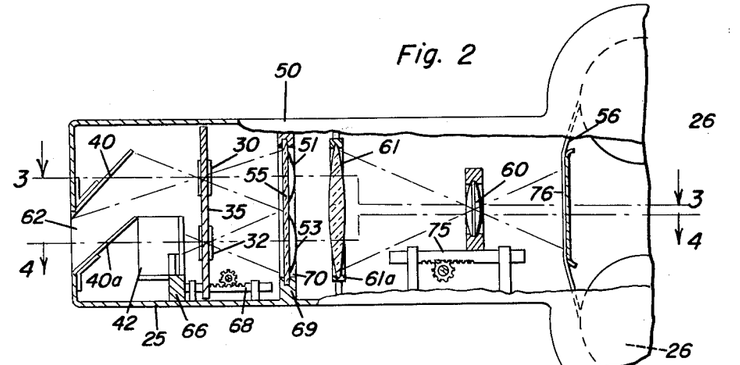
FIGURE 2 is an elevational sectional view through a camera using the system such as shown in FIGURE 1, which is, however, only diagrammatically illustrated.
Figure 3:
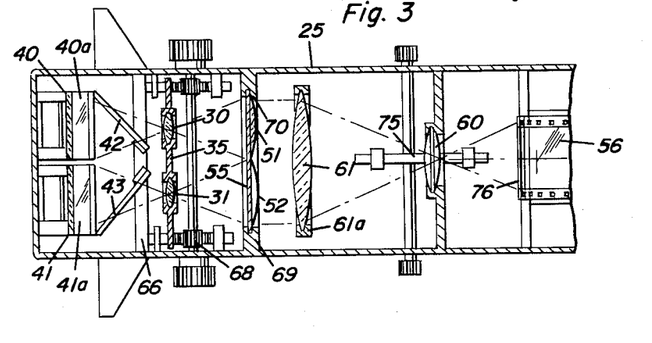
FIGURES 3 and 4 are sectional plan views of the same camera, the sections being taken along the lines 3—3 and 4—4 respectively, of FIGURE 2.
Figure 4:
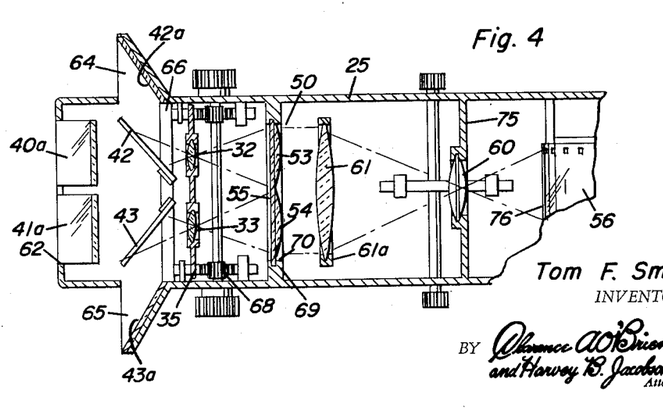

FIGURES 2, 3 and 4 illustrate a camera operating according to the above principle. Those parts in these figures which have been shown and illustrated in the diagrammatic FIGURE 1 are provided with the same reference numerals and letters.

The camera comprises a box 25 closed by a movable lid of the conventional type by means of which access may be had to the conventional film rollers 26 between which the film 56 is moved in the well known manner (not shown). The front portion of the camera is provided with openings 62, 64, 65 (FIGURES 2 and 4) arranged to face in different directions. In the example illustrated, in which the panoramic view is divided into four sections 21, 22, 23, 24, three openings 62, 64, 65 are arranged, one opening 62 being, however, an opening of double width, covering two sectors 22, 23. This double opening is arranged in the front end of the camera box between and above two other laterally spaced openings 64, 65 which are near and face the front end.

Mirror units 40a, 41a are positioned behind opening 62. Combined refracting and reflecting prisms may be substituted, if the desired angle cannot be encompassed by simple mirror units. Wedge-like support 66 is behind openings 64 and 65 (FIGURE 2) and it carries the two reflecting mirrors 42 and 43. These units receive their light through the spaced openings 64, 65 from the sectors 21 and 24 of the panoramic picture.

Behind the front end with its reflecting or refracting units, the first or sectional objectives carrier 35 is arranged holding the sectional objectives 30, 31, 32, 33. The number of sectional objectives corresponds to the number of sections into which the panoramic picture is divided, four such objectives being shown in the example illustrated in FIGURES 2, 3 and 4. Each sectional objective is centered on its refracting or reflecting unit 40, 41, 42, 43. The sectional objectives are all arranged in one plane, and they have a common focal plane 55. The sectional objective carrier 35 is adjustable in order to focus the picture obtained correctly, and there is a conventional gear slide 68 for making such an adjustment.

Partition 69 is behind the sectional objective carrier 35, and it has a central opening or window 70 carrying the plano-convex condenser-like lens assembly 50. This assembly consists of a number of plano-convex lenses 51, 52, 53, 54 equal to that of the sectional objectives, turning their planar surfaces towards the said sectional objectives; these planar surfaces are all in the same plane and preferably form a single unit with the lenses projecting from the common plane indicated at 55. The lenses may be cemented to a common base or otherwise constructed. As above stated, it is preferable to substitute for a simple plano-convex lens an assembly of anastigmatic lenses or of two plano-convex lenses facing each other as shown in FIGURE 1, thus producing a lense assembly similar to that used in condensers of motion picture projectors.

The optical axis of each plano-convex lens assembly is aligned with the optical axis of one of the sectional objectives 30, 31, 32, 33 and the planar bases of the plano-convex lens assembly are arranged in the common focal plane 55. Behind the plano-convex lens assembly the collimating lens 61 is arranged which may be adjustable and is carried on a lens support 61a.

At a suitable distance from the partition 69 and from the focal plane 55 of the sectional objectives, a further adjustable objective support 75 is provided which carries objective 60 making the mosaic picture. This objective is so constructed and arranged that a picture of all the real images in the focal plane 55 is produced in the focal plane 76 of a television camera or other camera such as would use sensitized film 56. Thus, each frame 58 of the film appearing in the film gate contains a plurality of sectional pictures appearing together and grouped in the manner shown in FIGURES 6 and 7.

Figure 6:
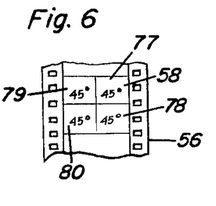
FIGURES 6 and 7 are fragmentary views of a film obtained by using the camera in FIGURE 1 or modifications thereof.
Figure 7:
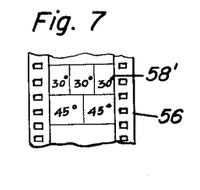

With the system of lenses illustrated in FIGURES 2, 3 and 4 a frame 58 of the film contains four sectional pictures 77, 78, 79, 80 of the same size arranged in the manner shown in FIGURE 6 in two rows and two columns, each of these pictures containing one sector 21—24 of the panoramic picture. In particular, the sectional pictures 77 and 78 contain a picture of the sections 22 and 23 of the panoramic picture, respectively, while the sections 79 and 80 contain pictures of sections 21 and 24 of the panoramic picture, respectively. If all four pictures are projected together, they thus cover the entire panoramic picture extending over an arc of 180° essentially without distortion and with uniform definition.

As will be clear, the general division of the panoramic picture is partly dictated by the nature of the picture taken, the effect to be produced, and the circumstances under which it is projected. In many cases, a panoramic picture of 120° will be sufficient to obtain the effect, and in other cases it will be inadvisable to divide that portion of the picture which contains the central section into an even number of sections. If the picture is divided in the center, a seam or dividing line appears in the middle of the picture.

Figure 5:
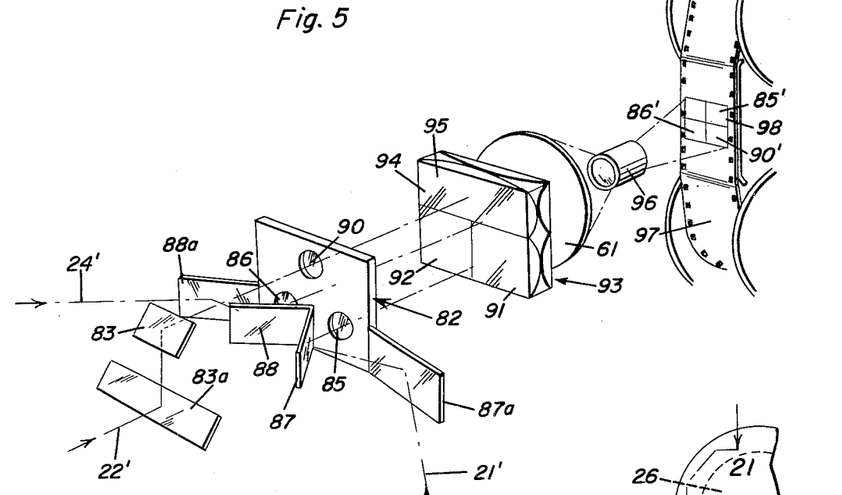
FIGURE 5 is a diagram similar to FIGURE 1 illustrating a modification of the arrangement shown in FIGURE 1.
Figures 19, 20:
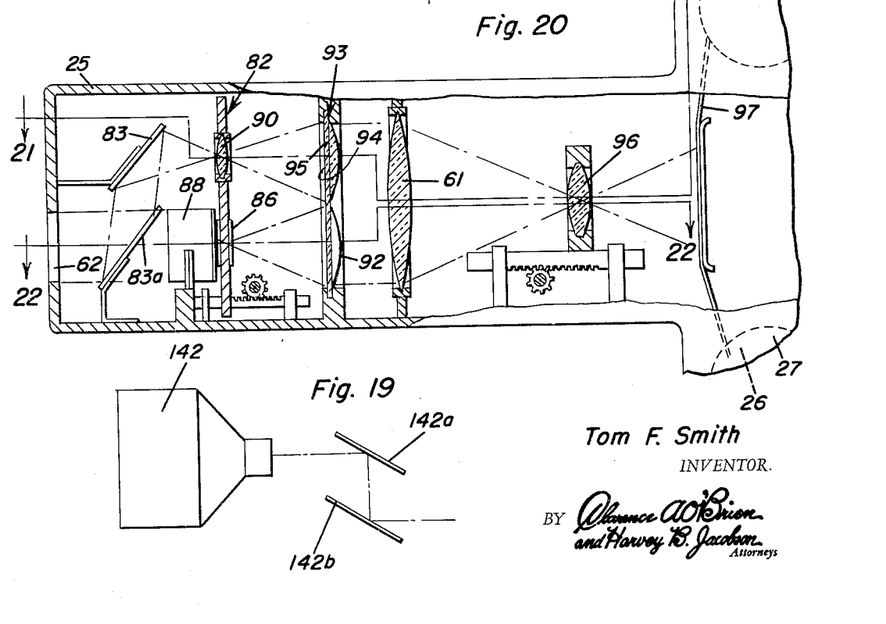
FIGURE 19 is a partial sectional view taken approximately on the line 19—19 of FIGURE 11 and showing one method of changing the level of view of one of the sections of each frame thereby overcoming the problem of realigning the sections as to proper relative level.
FIGURE 20 is a side sectional view showing a camera using a system as in FIGURE 5, there being slight structural difference between the cameras in FIGURES 2 and 20.
Figure 21:
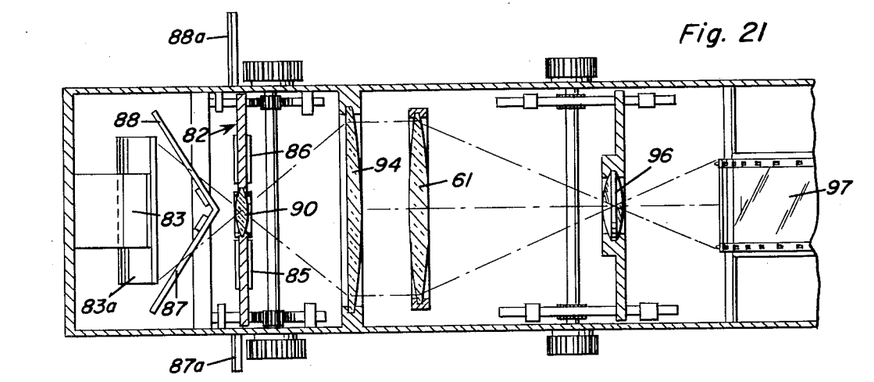
FIGURE 21 is a sectional view taken on the line 21—21 of FIGURE 20.
Figure 22:
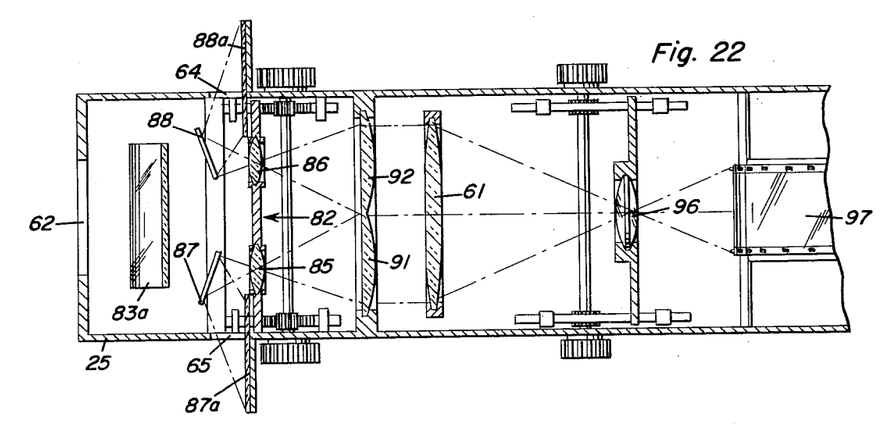
FIGURE 22 is a sectional view taken on the line 22—22 of FIGURE 20.

If such a dividing line in the center of the picture is to be avoided, it may be advisable to use a single objective for the central panoramic scene covering an angle of 90°. Such a construction is diagrammatically shown in FIGURE 5 and more fully shown as a camera attachment in FIGURES 20–22. FIGURES 20–22 are very similar to FIGURES 2–4 and therefore some of the parts common to the two groups of figures, have preserved the same reference characters.

As shown in the diagram, the panoramic view is here divided into three sectors 21', 22', 24', the two outer sectors 21' and 24' covering, like the sectors 21 and 24 of FIGURE 1, an angle of 45° of the panoramic scene. The central sector, however, encompasses an angle of 90° and thus covers an angle which, in the arrangement according to FIGURE 1, is covered by two sectors 22 and 23.

This entails a modification of the construction shown in FIGURE 1, and therefore the set of sectional objectives, generally indicated at 82, comprises only three objectives set at two different levels. The upper sectional objective 90 in the diagram faces the sector 22' of the panoramic view and is so constructed that it encompasses exactly an angle of 90°. To obtain sectional pictures viewed from the same center, a mirror assembly 83, 83a may be placed in front of the objective 90. It produces an image of this sector 22' in its focal plane indicated at 94, which plane is also the common plane of the planar faces of the plano-convex lens assembly 93.

The two sectional objectives 85 and 86 encompass an arc of 45° each and, as the section of the panoramic view which they portray is located on both sides of the central sector 22', they cooperate with a reflecting device, for instance with the mirror assemblies 87, 87a, 88, 88a which direct the light rays from these sections towards the objectives 85 and 86, the optical axes of which are parallel with the optical axis of the objective 90.

The plano-convex lens assembly 93 consists of three plano-convex lens units 91, 92, 95. The unit 95 extends over the entire width of the focal plane 94 and it faces the sectional objective 90, while the two units 91, 92 occupy only one-half of the width of the base plane 94. Thus, an image of the central sector of the panoramic view covering 90° is thrown on the upper half of the plane 94, while images of the two central sectors 21' and 24' are thrown by the mirrors into the objectives 86 and 85 and by these objectives on the lower half of the plane 94 of the planar surfaces of the plano-convex lenses. Each image formed by one of these sectional objectives 85 and 86 thus occupies only half of the width of the plane. As above mentioned, the plano-convex lens assembly is preferably of the condenser lens type and consists of two identical assemblies, the planar faces of which are parallel and turned toward the outside, while the convex surfaces face each other.

The images thrown on the plane 94, which is not only the planar surface of the unit 93 but is also the common focal plane of the sectional objectives 85, 86, 90 are viewed through lens 61 by the objective 96 which corresponds to the objective 60 in FIGURE 1, which objective throws the images on film 97. One frame 98 of the film (FIGURE 15), that is, the portion of the film appearing within the film gate which is exposed at one time, thus consists of the three sectional pictures 85', 86', 90' which are shown in detail in FIGURE 15. With this arrangement, as shown in FIGURE 16 diagrammatically, the advantage may be obtained that when projected on a screen there will be no seam or abutment or dividing line in the center, where such a line would be most conspicuous, especially when the center of attraction is positioned in or near the center of the screen picture.

If an objective covering an angle of 90° is not available, an arrangement may be used in which three sectional objectives are aligned and form an upper series which cooperates with two such objectives in a lower series. The arrangement of the objectives is essentially the same as that shown in FIGURE 1 except that a third objective is added covering the center portion which may directly receive the rays of the center section of the panoramic view without any refracting or reflecting means, while the other objectives receive their rays through the refracting or reflecting means above described in connection with FIGURE 1. The objectives of the upper series in this case need only encompass an angle of 30° each. The arrangement of the plano-convex lenses will correspond to that of the objectives, but will otherwise be the same as that already described. The frame 58' of the film will be divided in the manner illustrated in FIGURE 7.

The sectional objectives cooperating with the plano-convex lens assemblies may also form separate units so that the picture objective 60 (or 96), the film, and the film moving elements may be parts of a conventional standardized camera. The units containing the sectional objectives and plano-convex lens assemblies may then be so arranged that they point directly towards the sector of the panoramic view which they are supposed to reproduce without using any reflecting or refracting elements. However, between said units and the mosaic picture objective 60 (or 96) a refracting or reflecting unit must then be inserted which permits the focusing of all the plano-convex lens assemblies by one objective. FIGURES 10-14 show an arrangement of this type using such separate units.

FIGURE 12 again illustrates the principle on which the arrangement is based. As seen, an objective 110 and a plano-convex condenser-type lens assembly 111, preferably of a larger diameter, is held in a housing which consists of the two cylindrical portions 104, 105 holding the lenses and an intermediate conical portion 107.

The objective 110 may be turned towards a sector of the panoramic view while the objective 131 which throws the image onto the film is turned towards the plano-convex lens assembly. The optical axis of the sectional objective 110 and the picture-taking objective 131 may be the same or they may be parallel and a plurality of such units may thus be focused simultaneously by the objective 131. Various arrangements of this general type are diagrammatically shown in FIGURES 10, 11, 13 and 14.

Figure 10:
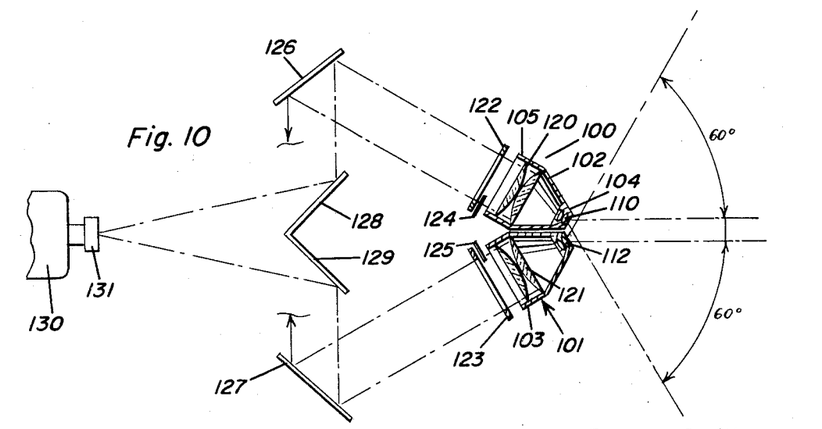
FIGURE 10 is a diagrammatic plan view illustrating a modification of the arrangement in which the sectional objectives together with a plano-convex lens assembly form part of a unit directed toward one sector of the panoramic picture, the diagram illustrating a panoramic picture encompassing 120°.

FIGURE 10 illustrates an arrangement designed for use with wide angle objectives, each of which may encompass an angle of 60° or 90°. Two units of the type above described are the minimum number of units necessary for taking such a panoramic picture. Each of the two units is provided with a wide angle objective and the picture taken by the camera thus consists of two sectional pictures which are joined at the center; particular emphasis is therefore to be laid on a neat joint.

In order to produce a frame containing the two sectional pictures made with wide angle objectives, which, for instance, encompass two sections of 60°, as shown in FIGURE 10, the two units 100 and 101, each facing a sector of panoramic view to be taken, are arranged side-by-side. Each unit comprises a housing 102, 103, respectively, which may consist of an objective tube 104 and of a much wider tube 105, joined by a conical junction pieces 107. The objective tubes 104 contain the sectional objectives 110, 112, respectively. The wider tube 105 contains the plano-convex lens units 120, 121. The optical axis of each unit 100, 101 is directed towards the center of the sector to be photographed, but preferably they may be so directed that the arcs encompassed by the objects slightly overlap, the overlap being preferably precisely regulated.

To secure an exact abutment without overlapping or with a precise amount of overlap, each unit is provided with an apertured mask 122, 123, respectively, cutting out exactly the desired picture size. In addition, adjustable masking strips or ledges 124, 125 may be used in order to produce a neat dividing or junction line in the center.

The image produced by the two sectional objectives 110, 111 is focused by the camera 130 by means of a mirror assembly. The mirror assembly consists of the two mirrors 126 and 127 facing the condenser-like plano-convex lens assemblies and of a double mirror arrangement 128, 129, respectively, in the center facing the camera 130. The camera objective 131 thus focuses simultaneously the two images produced by the two units 100 and 101 by means of the mirror arrangement 126, 127, 128 and 129, respectively.

Figure 11:
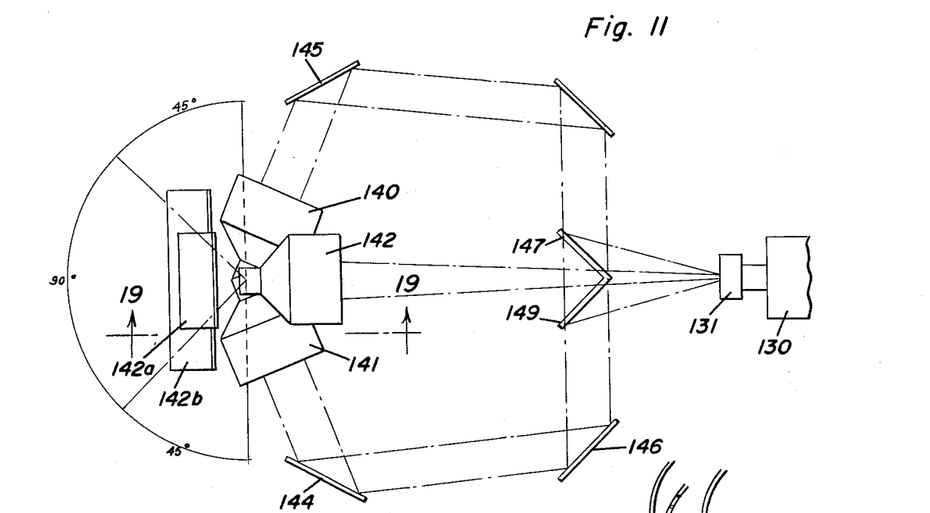
FIGURE 11 is a diagrammatic plan view illustrating an arrangement with units which are arranged in two levels, each unit encompassing a sector of the panoramic picture.

Modifications of the arrangement which is illustrated in plan view in FIGURE 11 comprises not only two units 140, 141 arranged in the same plane side-by-side on both sides of a plane of symmetry bisecting the panoramic view to be photographed but also comprises a third unit 142 arranged at a level immediately adjacent the level in which the units 140 and 141 are arranged. The panoramic view in this case is divided into three sectors which are unequal, one sector covering an arc of 90° and being in a central position, while the other two sectors are lateral sectors, each encompassing an arc of 45° on each side of the central sector.

The sectional objectives of the two smaller units 140, 141 may each directly point toward the center of one of the lateral 45° sectors of the panoramic view to be photographed. As the two units adapted for focusing views of a relative small angle are 135° apart, they may be arranged side-by-side.

Figure 9:
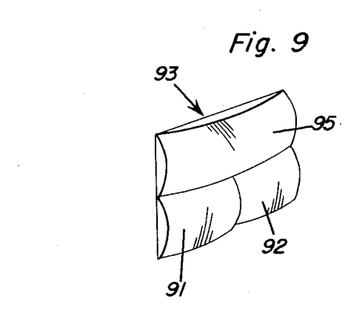
FIGURE 9 is a perspective view of a condenser-type plano-convex lens arrangement to be used in connection with the camera diagrammatically illustrated in FIGURE 5.

The larger unit 142 is provided with a sectional objective encompassing an arc of 90°, the optical axis of which may be located in the plane of symmetry, bisecting the panoramic view. The optical axes will then be so directed that they intersect in the same plane representing infinity. The shaft distortion introduced thereby is practically negligible. The plano-convex condenser lens assembly of this unit consists of a lens resembling the upper lens 95 shown in FIGURE 9; it will be of double width compared with the plano-convex condenser lenses of the other units 140, 141. The outer surfaces of said plano-convex condenser lens assembly of unit 142 are arranged at right angles to the plane of symmetry. For positive level correction, a system such as shown in FIGURE 19 may be used, noting that this corresponds to the mirror (or prism) assembly in front of lens holder 82 in FIGURE 5 and corresponding arrangements in other figures of the drawings. Two reflectors or beam bending devices, i.e. mirrors 142a and 142b are angled with respect to each other and unit 142 sufficiently to lower the level of the optical axis of unit 142 to coincide with those of coplanar units 140 and 141.

The camera 130 may be a motion picture camera of the conventional construction with an objective 131, the optical axis of which is coincident with the plane of symmetry above mentioned. The optical axis of the objective 131 is, however, at an intermediate level between that of the two units 140 and 141 and that of the unit 142 in the first alternative or directly in alignment with the three axes of units 140, 141 and 142, when correction by devices such as 142a and 142b are used, this being preferred. It thus focuses not only the plano-convex condenser lens assembly of unit 142 but also those of the units 140, 141. As the latter point outwardly in a direction which is at an angle to the optical axis of the objective 131, a mirror arrangement including the mirrors 144, 145, 146, and 147 and 148 and 149 are provided at the level of the units 140, 141 which direct the rays of the units 140, 141 into the objective.

Figure 15:
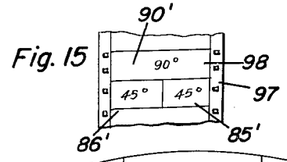
FIGURE 15 shows a fragment of a film, such as produced by an arrangement illustrated in FIGURES 5 or 11, showing the arrangement of the sectional pictures.
Figure 16:
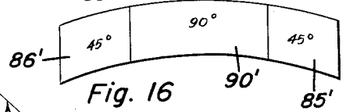
FIGURE 16 diagrammatically illustrates the way in which the projection pictures made by means of a film shown in FIGURE 15 will be aligned during projection.

The resultant picture appears in a frame of the motion picture film such as illustrated in FIGURE 15. The frame 98 is divided, one section 90' being occupied by a picture produced by the sectional objective of unit 142, while the other half of the frame is occupied by the two sectional pictures 86', 85' produced by the two units 140, 141, each covering an arc of 45°. These three pictures cover exactly one frame and must be rearranged during projection in the manner shown in FIGURE 16. It will be noted that such a projection picture has its dividing lines on the sides, the central section being undivided and being reserved for the center of attraction.

Figure 13:
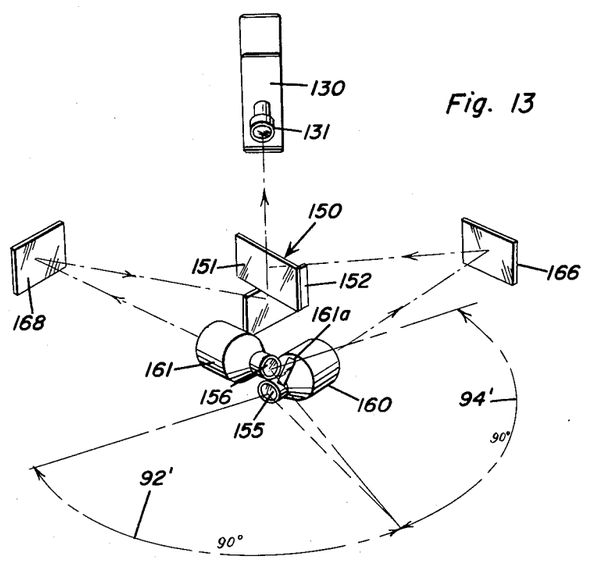
FIGURES 13 and 14 are diagrammatic perspective and plan views, respectively, of an arrangement somewhat similar to that shown in FIGURE 10, in which the units are arranged in two levels, each unit encompassing a sector of 90°.
Figure 14:
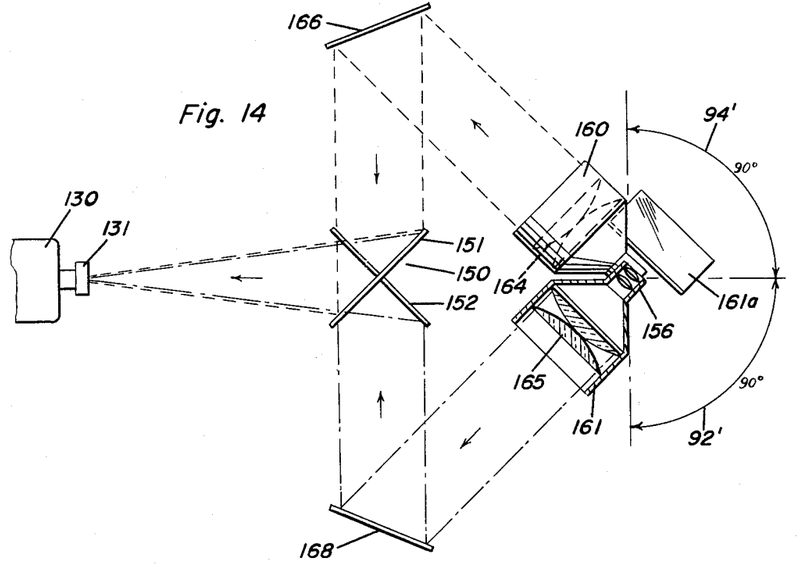

The panoramic view taken by a camera may also be subdivided into two sectors of 90° in the manner shown in FIGURES 13 and 14. According to the modification illustrated in these figures, two units 160, 161, each provided with a sectional objective 155, 156 encompassing 90° of the panoramic view, are used for producing the panoramic picture. The units used are essentially identical with those already described in connection with FIGURES 10, 11 and 12.

The sectional objectives 155, 156 are held in tubular housings which are connected by a conical intermediate portion with the tubular housings holding the plano-convex condenser lens units 164, 165. The units 160, 161 are placed on different levels, one above the other, with their optical axis at 90° with respect to each other. The top unit 161 (FIGURES 13, 14) is pointed towards the center of sector 94', while the lower unit 160 is pointed towards the center of sector 92'. The two units are again provided with masking means (not shown in these figures) for producing a sharp dividing line. If desired, the images of the two sectors can slightly overlap, but such an overlap is not indispensable as will be seen in FIGURE 14 where the centers of the two sectional objectives are aligned in a vertical of the plane of symmetry bisecting the panoramic view.

To enable the images produced by both units to be horizontally focused in a single objective 131 of a motion picture camera 130 of standard construction, reflecting prisms or mirrors 166, 168, respectively, are provided facing the plano-convex condenser lens units 164, 165. The two units face mirror assembly 150 consisting of the two mirrors 151, 152 which are arranged at two levels in such a manner that they cross each other at an angle of 90°. The axes of the units may again be slightly inclined so that they intersect the median horizontal plane passing through the center of objective 131 at a distance representing infinity. The preference, though, is to use a device to correct the level of one of the units, e.g. unit 161, so that the axes of the units 160 and 161 are at the same level, i.e. vertically aligned when the beams reach objective 131. Such a device 161a may be a prism in advance of upper unit 161 to lower the beam making it appear at the level of the beam of device 160 at objective 131. It is to be understood that other devices can be substituted for device 161a, e.g. a mirror, glass block, etc., each of which obtains the result shown in FIGURE 19. Further, the motion picture camera 130 is so positioned that the optical axis of its objective passes through the crossing points of the said two mirrors 151 and 152.

Figure 17:
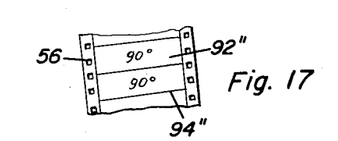
FIGURE 17 is a fragmentary view of a film such as produced by an arrangement shown in FIGURES 13 and 14, each of the two sectional pictures filling the whole width of the film.
Figure 18:
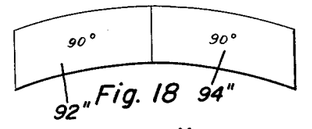
FIGURE 18 shows the way in which projection pictures would be aligned on a screen during projection when a film such as shown in FIGURE 17 is used.

The resulting panoramic picture obtained within a frame of film 56 is illustrated in FIGURE 17. It consists of two sectional pictures 92" and 94" representing the two sectors 92; 94 of the panoramic view, each covering an angle of 90° of the said view. The two sectional pictures are aligned on the film, as illustrated in FIGURE 18. In a longitudinal direction each occupying the full width of the film 56, but covering only one-half of the frame. Each picture will thus have a 2:1 aspect ratio. The projection picture illustrated in FIGURE 17 will align the pictures side-by-side and the dividing line or seam will again be in the center in this case.

It is thus seen that the invention provides means for subdividing a panoramic picture into sections of any angular extent. During the photographic exposure, the sections are simultaneously but separately photographed using separate lens systems. Further, means for assembling the separate pictures of the sections into a single picture are provided covering the area simultaneously exposed on the film and containing pictures of all sections. Thus, a single frame of the film contains all the elements from which the panoramic picture may be reconstructed by projection.

The means used are relatively simple and while a special camera may be used, the means according to the invention may also be incorporated into additional units to be used in connection with cameras of standard construction.

It may finally be remarked that while in connection with the system according to the invention as above described, it is necessary to use a plurality of sectional objectives which therefore take pictures from slightly different standpoints, the distance between the optical axes of the objectives is so small that the variation introduced by the different standpoint is negligible and cannot be detected by the unaided eye.

It will be clear that unessential changes may be made in the construction described and that the expert skilled in this art will be able to use many different constructions for applying the principle of the invention, such as defined in the annexed claims.

What is claimed as new is as follows:

1. A system of producing wide angle panoramic pictures on photosensitive film consisting of three first deflection means each positioned along the same plane to deflect a beam representing an arc of a portion of a horizontal panoramic scene, the middle first deflection means positioned to deflect the beam upwardly at a 90° angle with the incident beam, a second deflection means positioned to deflect the beam in the same direction as the said incident beam towards a first objective lens, the other two first deflection means positioned to deflect beams representing separate arcs of portions of a horizontal beam each being adjacent the beam deflected by the middle first deflection means, said other two first deflection means adapted to deflect the incident beams towards each other along the same plane and toward separate deflection means each adapted to deflect the beams in the same direction as the incident beams towards separate objectives, all the objectives being arranged in the same plane, a plano-convex lens assembly disposed to receive the beams emanating from the objectives with a separate plano-convex lens for each of the three objectives, said plano-convex lenses having planar surfaces arranged which are co-incident with the focal plane of each of the objectives and face said objectives thereby producing a real image on the faces of each plano-convex lens, a collimating lens positioned to receive the beams emanating from the plano-convex lens assembly, a further objective facing the collimating lens and plano-convex lens assembly for viewing all the simultaneously produced real images through said plano-convex lenses, a film with a light sensitive layer in the focal plane of said further objective, a frame of the said film receiving, during exposure, rays from all the real images produced by all the sectors of the panoramic views.

2. The system of claim 1 wherein the deflection means in each instance consists of a mirror.

References Cited in the file of this patent
UNITED STATES PATENTS

| 1,869,819 | Mammes | Aug. 2, 1932 |
|---|---|---|
| 1,894,265 | Chretien | Jan. 17, 1933 |
| 2,977,844 | Winkler | Apr. 4, 1961 |

FOREIGN PATENTS

| 504,388 | Italy | Dec. 11, 1954 |
|---|---|---|
| 1,136,355 | France | Dec. 29, 1956 |